United States Patent [19]

Gelhorn et al.

[11] Patent Number: 4,547,781

[45] Date of Patent: Oct. 15, 1985

[54] DEVICE FOR RECORDING DISTANCES TRAVELED ON PERSONAL AND BUSINESS USE

[75] Inventors: Carolyn Gelhorn, 1408-134 Smith St., Winnipeg, Manitoba, Canada, R3C 3W2, now by change of name from Carolyn Procter; Michael P. Gulas, Winnipeg, Canada

[73] Assignee: Carolyn Gelhorn, Ille Des Chenes, Canada

[21] Appl. No.: 488,205

[22] Filed: Apr. 25, 1983

[51] Int. Cl.[4] ............................................. G01D 9/00
[52] U.S. Cl. ................................... 346/33 R; 377/24; 235/97; 235/30 R
[58] Field of Search ...................... 346/33, 50, 79, 97, 346/33 D, 59, 60; 235/30 R, 32, 61 PD, 79, 97; 377/24, 29; 340/52 F

[56] References Cited

U.S. PATENT DOCUMENTS

| | | |
|---|---|---|
| 3,188,647 | 6/1965 | Davis .................................. 346/60 |
| 3,742,514 | 6/1973 | Sugimura ............................. 346/50 |
| 3,809,312 | 5/1974 | Warrick ............................ 235/30 R |
| 4,067,061 | 1/1978 | Jahasz .............................. 346/33 D |
| 4,188,618 | 2/1980 | Weisbart ........................... 340/52 F |
| 4,232,289 | 11/1980 | Daniel ................................. 340/576 |

Primary Examiner—E. A. Goldberg
Assistant Examiner—M. J. Reinhart
Attorney, Agent, or Firm—Stanley G. Ade; Adrian Battison

[57] ABSTRACT

A device for installation in a motor vehicle for recording distances traveled on business or non-business journeys comprises an input from the vehicle indicative of the distance traveled by the vehicle and manually operable keys for inputting into the device the purpose of the journey. The distance traveled and the purpose can be recorded for later printing on a paper supply contained within the device. A clock also records the time and data of the journey. Gas purchases can be recorded. A decimal keyboard can be used to require the introduction of an identification code before the device can be operated.

3 Claims, 4 Drawing Figures

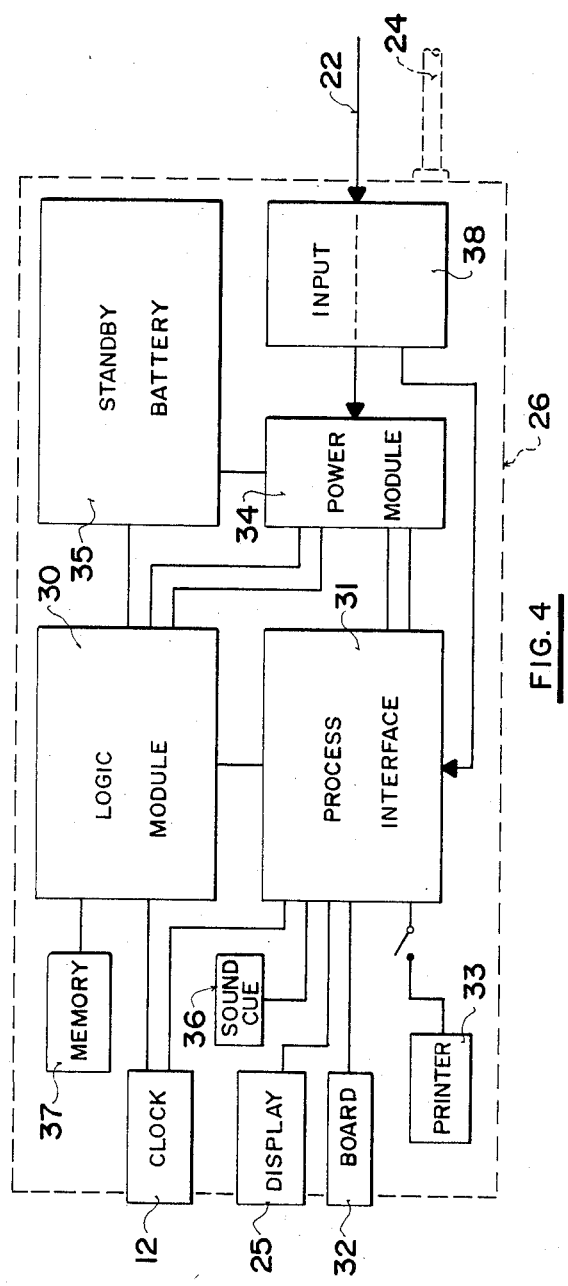

DEVICE FOR RECORDING DISTANCES TRAVELED ON PERSONAL AND BUSINESS USE

BACKGROUND OF THE INVENTION

The invention relates to a device for installing in motor vehicles for recording distances traveled.

Many motor vehicles are used in circumstances where it is necessary to record the distance traveled. This occurs for many people at all times in that for income tax purposes they are required to distinguish between the personal and business use of the motor vehicle for a whole year in order to pro-rate those expenses which can be written off against tax versus those expenses which are for personal purposes and hence cannot be written off. At the present time this assessment is often made as a rough guess at the end of the year without any proper records since the keeping of the proper records is a time consuming process requiring great attention to detail. Obviously therefore the rough guess technique can be wildly inaccurate one way or the other with a consequent considerable error in the tax write off calculation.

In another circumstance where the occupant of the motor vehicle reclaims expenses from an employer or client it is desirable to keep accurate records of distances traveled.

In a yet further example, some vehicles are used by many different people for different purposes some of which can be authorized business use and some of which can be unauthorized private use of the vehicle concerned.

In recent years a trip-meter or odometer has become common in many vehicles so the occupant can set the distance traveled to zero before commencing any particular journey then note the distance traveled at the end of the journey. This is often an assistance to the recording of distances traveled but still requires the occupant to take notes of those distances particularly where many different trips are involved over a period.

The present systems are therefore open to error or abuse with generally the authorities involved being unable to check on the accuracy of submissions made by individuals or employees.

SUMMARY OF THE INVENTION

It is one object of the invention therefore to provide a device which enables the recording of distance traveled by a motor vehicle in conjunction with a characteristic of the purpose of the traveling to enable the keeping of more accurate records.

Accordingly the invention provides a device for installing in a motor vehicle for recording distances traveled comprising first input means, means for connecting said first input means to said vehicle for automatically receiving therefrom an input indicative of distance traveled by the vehicle, second input means operable by the occupant of the vehicle for entering prior to a journey an input indicative of a characteristic of the distance being traveled in the journey, and means for recording the distance traveled in conjunction with the characteristic entered.

It is one advantage of the invention therefore that the occupant of the vehicle can be required to enter the characteristic prior to commencing the journey so that distances cannot be falsified or changed subsequently using hindsight.

It is a further advantage of the invention that it can include a printer for providing a paper printout on certified or verifiable paper.

It is a further advantage of the invention that the device can include a clock so that it records together with the distance and the characteristic the date and time of the journey as a further check on the accuracy of the records kept.

It is yet a further advantage of the invention that it can include input keys for inputing details of gas purchases by cost and amount to keep an accurate record of the total costs for later division into the separate characteristics.

It is yet a further advantage of the invention that it can include a keyboard for inputing an identification code and means for comparing the entered code with a stored code. A positive match can be used to initiate the device and prevent its use by persons ignorant of the necessary code.

With the foregoing in view, and other advantages as will become apparent to those skilled in the art to which this invention relates as this specification to the accompanying drawings forming a part hereof, which includes a description of the best mode known to the applicant and of the preferred typical embodiment of the principles of the present invention, in which:

DESCRIPTION OF THE DRAWINGS

FIG. 4 is a schematic diagram of the interior components of the device of FIG. 1.

In the drawings like characters of reference indicate corresponding parts in the different figures.

DETAILED DESCRIPTION

Figure 1:
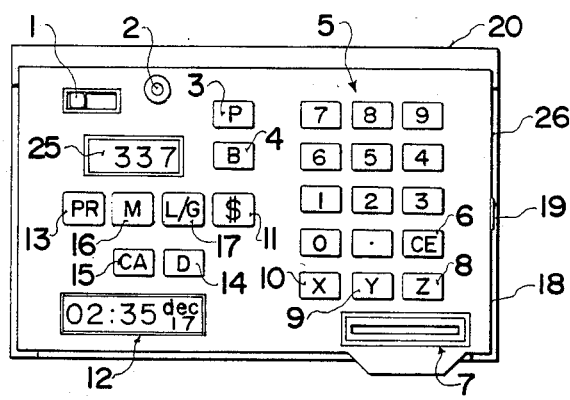
FIG. 1 is a front elevational view of a device for installing in the motor vehicle for recording distances traveled showing particularly the keyboard and display.

The device shown in the drawings comprises an outside casing mounting a keyboard on the front face as shown particularly in FIG. 1. The keyboard includes an on/off switch 1 incorporating an LED on light 2.

A standard decimal entry set of keys 5 is included toward one side face of the front panel incorporating a standard clear/error button 6 as one of the keys.

An LCD display 12 is provided on the front panel showing the time and date. An LED display 25 is provided on the front panel above the clock display 12 for displaying sets of numbers as recorded in the device and will be explained in more detail hereinafter.

Further keys are provided at 3 and 4 with the symbol "P" and "B" respectively indicative of pleasure or non-business journeys and business journeys respectively. It will be noted that the keys 3 and 4 are set toward the top of the front panel and separated from the remaining keys by greater distance since these keys are of particular importance and are most often used.

Six further keys indicated at 11, 13, 14, 15, 16 and 17 include the legends "$", "PR", "D", "CA", "M" and "L/G". Finally three keys 8, 9 and 10 include the legends "Y", "Z" and "X". In addition the front face includes a paper port 7 comprising a slot in the front face through which paper printed in accordance with the sets of numbers stored in the device as will be explained hereinafter. A supply of the paper can be inserted into the device from an opening provided in the side of the device shown in FIG. 2 covered by a lid 18 operated by a catch 19.

Figure 2:
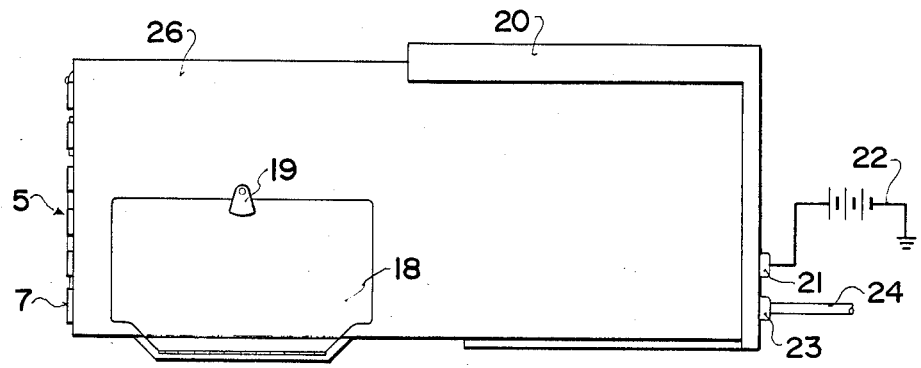
FIG. 2 is a side elevational view of the device of FIG. 1.

In addition to the inputs from the keyboard shown in FIG. 1, the device has a power input from the battery of the motor vehicle shown schematically in FIG. 2 with a power line 22 providing a 12 volt DC input to an input plug 21. A connection from the speedometer of the motor vehicle is also applied to the rear of the casing as shown in FIG. 2 schematically as an input socket 23 and cable 24. This input from the speedometer can either be of a mechanical nature or more preferably it can be an electrical connection. Such a connection can be provided by an infrared light source and receiver which acts to provide a pulse for each rotation of a mechanical part associated with the speedometer by the provision of a hole in the mechanical part through which the infrared light passes every time the hole passes the source. Devices of this type are conventionally available and are well known to one skilled in the art. It suffice to say that the input cable 24 supplies an input signal indicative of the distance traveled by the vehicle.

Figure 3:
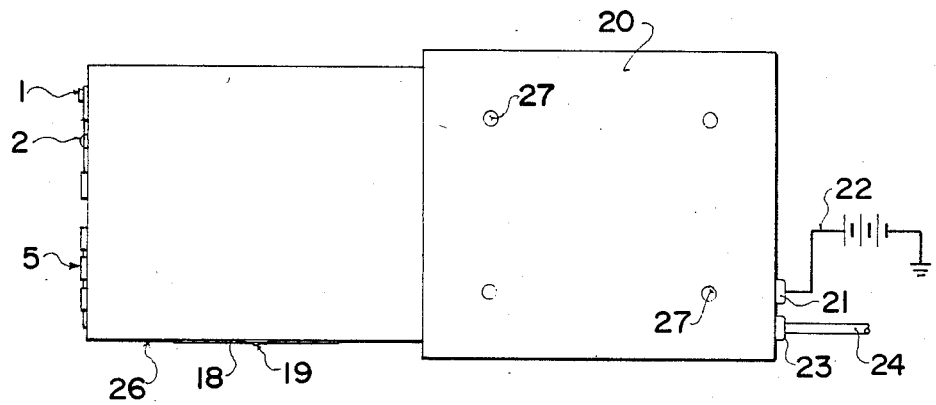
FIG. 3 is a top plan view of the device of FIG. 1 showing the mounting bracket.

Referring now to FIGS. 2 and 3, the device includes a rectangular housing 26 which can slide into location in a mounting bracket 20 suitably secured within the motor vehicle by four screws passing through openings 27 provided in the mounting bracket. The plugs 21, 23 are provided in the mounting bracket 20 with respective pins (not shown) provided on the rear of the casing 26 so that as the casing slides into the mounting bracket the pins enter the plugs 21, 23 to provide the necessary outside connection. Thus the casing 26 can be slid readily in and out of the mounting bracket 20 to enable the device to be removed from the vehicle to prevent theft whenever the vehicle is left unattended.

Turning now to FIG. 4, the interior components of the device are indicated schematically. The main structure of the device is formed by a logic module 30 and a process interface 31. The logic module receives input from the clock 12 and communicates it directly with the process interface which is connected to the keyboard generally indicated at 32 and the display 25. In addition the process interface is connected to a printer and paper motor drive generally indicated at 33 and to an input 38 connected to the power cable 22 and to the input cable 24 from the speedometer. A power module 34 receives power in the input 38 from input cable 22 for communication to the device generally with a standby battery 35 of the trickle charged NICAD type also included to provide power solely to avoid loss of memory when the 12 volt power supply is disconnected. The process interface 31 also communicates with a sound cue device 36 and memory 37.

In operation of the device, before commencement of a journey the logic module acts to issue a sound cue to the vehicle operator to remind him to enter into the device the characteristics of the journey proposed, that is whether it is intended to be for business purposes or for non-business purposes. This can be simply entered into the device by the operator pressing the P or B button 3,4 on the keyboard face which characteristic is recorded by the logic module. During the journey therefore the device acts to continually determine the distance traveled and to record the distance in the memory 37. At any instant during the journey the operator can display the distance traveled to date on the journey by depressing the key CA.

After completion of the journey the total distance traveled in that journey together with the characteristic of business or non-business is recorded in the memory 37. All journeys must therefore have one of the two characteristics recorded relative thereto. The operator can obtain a printed confirmation of the distance traveled on the journey by depressing the key PR which acts to operate the printer 33 and feed forward the printed paper on which the information in contained.

If during the journey the operator makes a purchase of gasoline for the vehicle this can be entered into the memory 37 both in terms of the cost and the amount of the purchase firstly by depressing the $ sign key and then entering the costs numerically on the keyboard 5 and then the amount of the purchase is introduced by depressing the L/G and the numerical amount.

If a number of different journeys are carried out during a time period, the distances traveled and the characteristic of the journeys is recorded in the memory 37 and can be recovered by pressing the PR key which acts to print out the full details of the journeys concerned and including any gasoline purchases. The retention of the different journeys in the memory 37 can be arranged for a relatively short period such as a day or a week with it being intended that the operator print out the information regularly and maintain the confirmed information by keeping the printing sheets. Alternatively the device can be arranged to retain details of all journeys for a period of up to one year such that a complete record is kept in the device for yearly income tax returns.

In order to assist calculations, in addition to printing out a full record of all journeys involved the device can also print out totals calculated by the logic module 30. The totals can be printed out by depressing the total key X together with the print key PR and the category of information required that is P, B, $, or L/G. Thus separate totals of the private journeys, business journeys, dollar value of gas purchases and volume of gas purchases can be printed out separately.

In order to activate the device, it is necessary to enter an identification code by initially depressing the key D, and subsequently the numerical keys, which code is compared with a stored example of the identification code before the device is operated. This identification code can also be printed with the information defined above to act as a yet further verification of the accuracy of the journey records. Furthermore the identification code prevents the device being used by an unauthorized person and particularly a stolen device cannot be used thus reducing the desireability of stealing such devices.

In an alternative arrangement (not shown) the device can be connected into the ignition circuit of the motor vehicle thus preventing operation of the vehicle until the identification code is entered. This can be used to prevent unauthorized use of the vehicle and also to require that the device is operated prior to commencement of a journey as opposed to merely a sound cue which can of course be ignored.

In the circumstance where a number of different persons are authorized to use a particular vehicle, the device can be programmed to accept a number of different identification codes so that each person authorized to use the vehicle can have their own code. In this arrangement it is more important that the identification code is also printed with the journey details so that a full check on the use of the vehicle can be maintained and unauthorized use by authorized persons prevented. The total of distances traveled for each identification code can be obtained by depressing the Z key followed by the P or B key and the PR key.

The use of the Y key acts to separate the display and the decimal key board from the normal functions of the device so they can be used simply for calculation purposes without interfering with the memory of past journeys or the storage of current information on the journey concerned. In the embodiment shown, the device is switched on with the on/off switch at the commencement and is switched off at the end of the journey. This time of commencement and time of completion is recorded for later printing together with the distance traveled on the journey. The information is stored only until the C/E key is depressed twice thus clearing the memory completely. In conventional manner depresssion of the C/E button once merely acts to clear an error in depression of a particular key.

Alternatively the device can include means for preventing erasing of long term memory until it is required to do so for example at the end of a tax year. Specifically the device can require insertion of an identification code before clearing the memory to prevent tampering and inadvertent loss of the information. Printed information can be obtained for any intervening period without interfering with the long term memory.

Since various modifications can be made within the spirit and scope of the claims without departing from such spirit and scope, it is intended that all matter contained in the accompanying specification shall be interpreted as illustrative only and not in a limiting sense.

I claim:

1. A device for installing in a motor vehicle for calculating and recording distances traveled distinguished between those undertaken for business purposes and those undertaken for nonbusiness purposes, the device comprising:

recording means;

first input means, means for connecting said first input means to said vehicle for automatically receiving therefrom an input indicative of a distance traveled by the vehicle on a journey;

second input means consisting of only two separate keys, one arranged to enter into said recording means a character indicative of business use and the other arranged to enter into said recording means a character indicative of nonbusiness use, said second input means arranged such that one of said two characters is entered into said recording means for all said journeys traveled by the vehicle;

third input means comprising a decimal key pad;

fourth input means for entering into said recording means in conjunction with said decimal key pad a code for further characterizing said journey;

fifth input means for entering into said recording means in conjunction with said decimal key pad details of fuel purchased for said vehicle;

sixth input means comprising a clock for entering into said recording means in relation to said journey a time and date;

and printing means including paper supply means for printing on the paper the distance traveled together with the indicative character, code, fuel purchased, time and date.

2. A device according to claim 1 including means for totaling the recorded distances traveled in a plurality of said journeys in conjunction with the indicative character on said second input means.

3. A device according to claim 1 including means for issuing a warning signal to inform the occupant of the requirement to enter the indicative character on said second input means.

* * * * *